United States Patent [19]

Ellzey, Jr.

[11] 3,851,386

[45] Dec. 3, 1974

[54] METHOD OF TENSIONING BOLTS

[76] Inventor: Lucian L. Ellzey, Jr., 6909 N. Grove, Oklahoma City, Okla. 73127

[22] Filed: Aug. 31, 1973

[21] Appl. No.: 393,412

[52] U.S. Cl. .................. 29/407, 73/88 F, 85/62, 116/114 R
[51] Int. Cl. ........................... B23q 17/00
[58] Field of Search ........... 29/407; 85/62; 73/88 F, 73/141 R, 141 A; 116/114 R

[56] References Cited
UNITED STATES PATENTS

| | | | |
|---|---|---|---|
| 3,153,974 | 10/1964 | Canning | 116/114 R X |
| 3,383,974 | 5/1968 | Dahl | 85/62 |
| 3,405,597 | 10/1968 | Elsner et al. | 85/62 |
| 3,469,492 | 9/1969 | Dahl | 85/62 |
| 3,602,976 | 9/1971 | Grube | 29/407 |

Primary Examiner—C. W. Lanham
Assistant Examiner—Victor A. DiPalma
Attorney, Agent, or Firm—William R. Laney

[57] ABSTRACT

The method of tensioning a nut engaging bolt comprising the steps of placing a first indexing mark in a visible location on the bolt, then, on a non-moving member which is juxtapositioned with respect to the bolt as the bolt is tensioned for joining two members together, placing a second indexing mark at a predetermined location on said non-moving member, at which location said second indexing mark is aligned with said first indexing mark when the bolt has been properly tensioned. Finally, the bolt is rotated while retaining the nut stationary for a predetermined number of complete rotations of the bolt, and a further fractional rotation sufficient to bring said first and second index marks into alignment.

8 Claims, 3 Drawing Figures

PATENTED DEC 3 1974　　　　　　　　　　　　　3,851,386

METHOD OF TENSIONING BOLTS

BACKGROUND OF THE INVENTION

1. Field of the Invention

This invention relates to methods of construction, and more particularly, to methods of tensioning bolts of the type which engage nuts and are used to join two structural members to each other by placing the shank of the bolt in tension between the head of the bolt and the nut.

2. Brief Description of the Prior Art

It has heretofore been recognized that bolts of the type which threadedly engage a nut and which are used for joining two structural members to each other should be tightened to a certain extent in order to assure the fulfillment of the function of the bolt in joining the two members over an extended period of time. It is further known, however, that it is easy to overstress the bolt by turning it too many times with respect to the nut so that the shank of the bolt is tensioned to the point where the metal of the bolt is fatigued and the bolt fails. Failure of the bolt, of course, results in a complete disengagement of the structural members which it is intended to join, and its purpose is then defeated.

In order to assure proper tensioning of the bolt used for joining two structural members, a number of devices and techniques have heretofore been employed to assure that adequate tightening or tensioning is realized without excessively tensioning the bolt and causing its failure. One of the simplest methods employed is the so-called "turn of the screw method" sometimes used in heavy construction where girders and other members are joined in a building. In this method, the nuts are simply turned up on the threaded shank of the bolt until they are finger tight. After this, a predetermined number of turns are imparted to the bolt by the use of a wrench or other suitable device with which the head of the bolt is engaged, and the same types of structural members are joined with the same types of bolts.

This method has the merit of at least uniformly tensioning all of the bolts, and, provided the initial calculation of the number of turns is proper, and provided further that the structural members are all the same and the bolts and nuts are all the same, the system will afford reasonable assurance that the bolts are sufficiently tight and that they are not overstressed by excessive tightening. One of the disadvantages of this method is that either the number of turns which should be imparted to the bolt is not always properly calculated, or is calculated with too wide a tolerance so that maximum efficiency of the bolt is not attained through too wide a margin of safety allowed to avoid overtensioning of the bolt. Further, careless workmen charged with tightening the bolts by the use of the turn of the screw method will not always be scrupulous in their attention to applying the correct number of turns to the bolt, with the result that overstressing of the bolt may result, or the bolt may not be sufficiently tightened to prevent undesirable vibrational stress and shear forces being applied to the bolt due to excessive looseness resulting from such insufficient tightening.

One of the most widely used methods of tightening bolts to impart adequate tension to the bolt over its service life is that of utilizing torque wrenches for tightening the bolt. These devices are particularly widely used where precision in tightening of the bolts is very important, and where the structures joined by the use of the bolt are subject to extreme vibration during the service life of such structures. Torque wrenches generally, as the name suggests, measure the amount of torque which is required to turn the bolt and, of course, the torque increases as the difficulty of turning the bolt increases. This is a measure of the tension imparted to the shank of the bolt. It is an indirect measure of such tension because other factors may also influence the magnitude of the torque required to turn the bolt at each stage of its tightening. Thus, where the threads of the bolt carry a heavy lubricant, less torque is required to tighten the bolt than if the threads are rusty or carry a film of oxidized metal. Moreover, stripping or distortion of the threads on the bolt will also cause a variation in the torque required to tighten the bolt. Rust or corrosion on the surface of one of the joined members against which the bolt head bears during tightening will also affect this torque so that the particular torque required to tighten the bolt to its optimum degree of tensioning may vary considerably from that which might have been contemplated by the manufacturer or by the structural engineer based simply on the size of the bolt, the type of steel of which it is constructed and the types and sizes of structural members which it is to join.

Because of the inaccuracies of torque wrenches and the hit or miss inherent weaknesses of the turn of the screw method, certain other techniques and devices have been developed for optimally tensioning bolts. Many of these devices or techniques are based upon the compression of some type of compressible member between the head of the bolt and one of the structural members to be joined, or between the nut of the bolt and a joined structural member. Such compressible member undergoes compression with concurrent expansion in one direction as the bolt is tightened with the result that various parts of the member change geometric dimensions, or a color becomes exposed as a part of the member is compressed and causes to distort in one direction. In sum, these devices are based upon a visual observation in which the distortion is visible, or results in a visible change in the tension indicating element associated with the bolt and nut.

Other proposals for properly tensioning the bolt have been based upon the direct measurement of the length or degree of extension of the bolt as it is tightened, but this method of measuring the tension imparted to the bolt as it is tightened involves relatively expensive instruments, and these frequently cannot be employed because the ends of the bolt cannot be made accessible to the instrument due to the particular conditions under which some bolts are utilized.

Among U.S. Patents which disclose devices previously employed for providing a more accurate or reliable indication of the degree to which a bolt has been tensioned may be mentioned Grikscheite et al. No. 3,224,316; Gill No. 3,194,105; Johnson No. 2,824,481; Ralston No. 2,464,152; Dahl No. 3,383,974; Canning No. 3,153,974; Blakeley No. 3,428,923; and Adise No. 3,060,731. Most of the techniques and devices which have been employed for tensioning bolts in accordance with the teachings of the foregoing patents, and also the described methods as hereinbefore set forth, lack simplicity and ease of use, and frequently the workmen who are expected to use these techniques and devices lack the concern to assure proper employment of the technique or tool provided, or lack sufficient understanding of the method of use of the more sophisticated devices to assure that their full potential is realized.

BRIEF DESCRIPTION OF THE PRESENT INVENTION

The present invention comprises an improved method for tightening bolts to achieve sufficient tensioning to assure adequate holding power of the bolt without overtensioning or fatiquing the bolt. In one aspect, the invention contemplates a method of manufacturing bolts to facilitate optimum tensioning of the bolts when used to join a plurality of pre-identified structural members.

Broadly described, the method of tensioning carried out in accordance with the present invention involves initially placing a first indexing mark in a visible location on the bolt. Then, on a non-moving member juxtapositioned with respect to the bolt as the bolt is tensioned for joining a plurality of members, a second indexing mark which has been predetermined to be placed at a particular location is placed at that location. Predetermination of the location of the second indexing mark on the non-moving member is based upon a state of alignment which shall be made to exist between the first and second indexing marks at a time when the bolt has been placed in optimum tension by tightening.

After placement of the second indexing mark on the non-moving member, the nut of the bolt is tightened to a finger-tight status after the members to be joined have been placed in substantially that position which they are to occupy when joined. The bolt is then rotated for a predetermined number of complete rotations while retaining the nut stationary. The bolt is then further rotated a fraction of a rotation which is sufficient to bring the first and second index marks into alignment. The method of the invention, as thus described, has the great merit of causing the head of the bolt to move a certain precise distance with respect to the threads on the shank of the bolt which are engaged by the nut, and which are rendered substantially immovable by the bearing of the nut against one of the members to be joined. Because it is a direct linear measurement which can be converted from rotations of the head of the bolt to extension of the shank between the head and the nut, and thus to the tension imparted to the bolt, it is an extremely accurate method of tensioning, provided it is carried out for a bolt of known size and metal, and for the purpose of joining two structural members of known dimensions and compressibility.

It will be apparent that, after the nut is brought up to position of firm contact with the structural member to be joined (or finger tightened), the nut may then be rotated through the required number of turns while the bolt is held stationary, instead of the reverse procedure being followed.

An important object of the invention is to provide an improved method for tensioning a nut engaging bolt so as to provide optimum holding power in performing the function of retaining two or more structural members in juxtaposition to each other without overtensioning of the bolt resulting in its failure.

An additional object of the invention is to provide a method for manufacturing bolts and nuts such that the user of the bolt may use the bolt more efficiently, and with less chance of structural defects ultimately resulting from overtensioning the bolt and its consequent failure.

Another object of the invention is to provide a method of tensioning a bolt to an optimum degree, which method is very simple to use and can be understood and used effectively by persons with no technical training or skill.

Additional objects and advantages of the invention will become apparent as the following detailed description of certain preferred embodiments of the invention is read in conjunction with the accompanying drawings which illustrate the invention.

DETAILED DESCRIPTION OF PREFERRED EMBODIMENTS OF THE INVENTION

Figure 1:
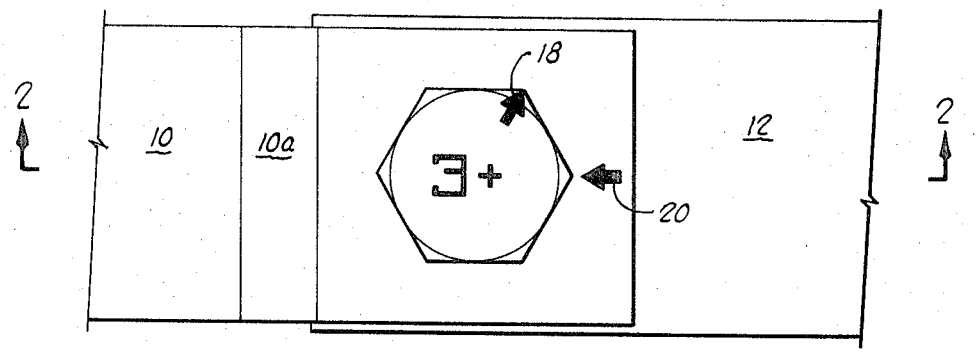
FIG. 1 is a plan view showing the head of a bolt constructed in accordance with the present invention as it appears when it is used in the process of joining a pair of structural members to each other.

Referring initially to FIG. 1 of the drawings, shown therein are a pair of plates 10 and 12 as they appear when the adjacent end portions of the plates are to be joined or secured together by means of a bolt and nut. The plate 10 is stepped or angulated as shown at 10a, and the plate 12 is a substantially monoplanar member.

Figure 2:
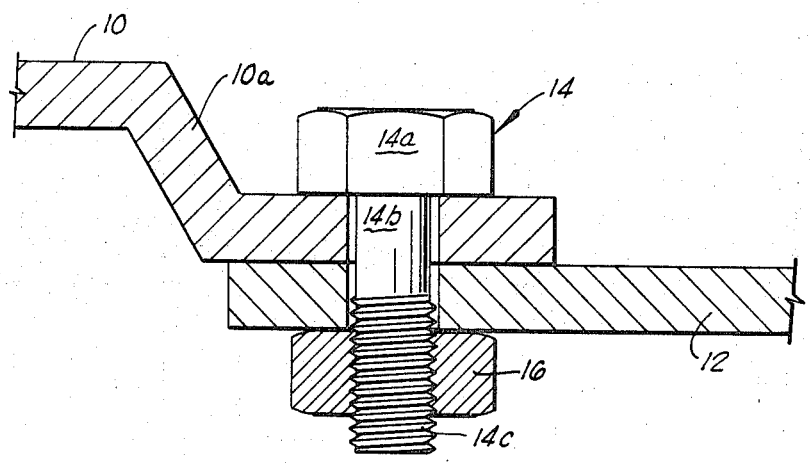
FIG. 2 is a sectional view taken along line 2—2 of FIG. 1.

As shown in FIG. 2, the plates or structural members 10 and 12 are joined to each other by means of a bolt designated generally by reference numeral 14 and a nut 16. The bolt 14 is of a type having a hexagonal head 14a secured to one end of an elongated shank 14b which carries around the outer periphery thereof, a plurality of threads 14c. It will be perceived in referring to FIG. 1 that the head 14a of the bolt 14 carries certain indicia thereon, with such indicia including an arrow 18 which preferably points to the apexes of the bolt head at one corner of the hexagonal configuration. The indicia further includes a numeral 3 and a plus sign (3+).

An indexing mark, which can conveniently be an arrow 20, is formed on the portion of the plate or structural member 10 immediately adjacent the bolt head 14a, and preferably is located so as to point at a preselected one of the apexes of the bolt head. In the illustrated embodiment of the invention, the arrow 20 points to the apex of the hexagonal bolt head 14a adjacent the apex toward which the arrow 18 carried on the bolt head points.

The indicia appearing on the bolt head have been located there in accordance with a predetermined procedure for tensioning the bolt so as to achieve optimum tensioning of the bolt while avoiding overtightening resulting in failure.

In explaining the method of tensioning bolts in accordance with the invention, it should first be pointed out that the indicia carried on the head of the bolt has first been determined in accordance with the manufacturing procedure hereinafter described, and indicates to the user of the bolt the number of complete turns of the bolt which should be made in tightening the bolt. The plus (+) sign then further indicates that the bolt should be tightened further in addition to the three complete turns to an extent such that the arrow mark 18 is brought into alignment with the indexing arrow 20 carried on the plate 10. Instructions are provided with the nut and the bolt for their usage which specify that the arrow 20 constituting the indexing mark shall be located on the plate 10 immediately adjacent the bolt head and spaced around the bolt head 14a at a point such that it is one apex removed on the hexagonal bolt head from the arrow 18. The instructions state that this status of the bolt 14, the arrow 18 carried on the head thereof and the indexing arrow 20, shall be achieved by placement of the indexing arrow 20 after the nut 16 has been advanced on the thread 14c to a point such that it is finger tight, and the plates 10 and 12 flatly abut each other as shown in FIG. 2.

With these instructions in hand, the workman charged with joining the plates 10 and 12 places the bolt, nut and plates 10 and 12 in the position depicted in FIGS. 1 and 2. In this status, the workman has tightened with his fingers or a light wrench, the nut 16 until the nut is finger tight, or is brought to bear against the lower side of the plate 12. At this time, the workman marks, with a suitable marker, an arrow 20 at the location depicted on the plate 10, following the instructions which direct that this arrow be placed at a corner of the hex head bolt next adjacent the corner location of the arrow 18 (and in a clockwise direction therefrom). With the bolt 14 and nut 16 in this status, the workman then commences to tighten the bolt with a suitable wrench and, pursuant to the instructions, makes three complete turns of the bolt head and finally, goes past the termination of the third complete turn until the arrow 18 is aligned with the indexing arrow 20. At this time, the bolt will have been tensioned to a degree sufficient to tightly retain the plates 10 and 12 in their interlocked or engaged status. Assurance is also had that the bolt will not have been excessively tightened to the point where it may fail in the shank, or the threads stripped to allow looseness.

Figure 3:
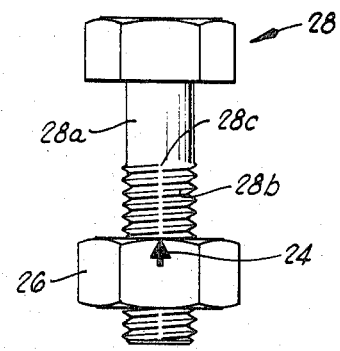
FIG. 3 is a side elevation view of a nut and bolt constructed in accordance with another embodiment of the invention.

In FIG. 3 of the drawings, a different embodiment of the invention is illustrated. Here, an indexing arrow 24 is provided on a nut 26 and corresponds, in function, to the indexing arrow 20 carried on the end portion of the plate 10 in the embodiment of the invention depicted in FIG. 1. In this case, this arrow may have been located on the nut at the factory manufacturing the bolt and nut. The bolt 28 used in this embodiment of the invention includes a shank 28a carrying an interrupted thread 28b. As will be apparent in referring to FIG. 3, the interrupted thread 28b has an axially extending groove or slot 28c formed therein from one end of the thread to the other, and this groove or slot corresponds in function to the arrow 18 carried on the bolt head 14a in the embodiment depicted in FIGS. 1 and 2. The head of the bolt 28 also carries on its upper side, indicia (not shown) similar to the indicia 3+ carried on the top of the bolt head 14a in FIG. 1.

In using the embodiment of the invention depicted in FIG. 3, the bolt 28 is again placed in position with the nut moved up to a finger tight position where it abuts against the underside of the plate 12. The workman then understands from the indicia on the bolt head and accompanying instructions that he is to tighten the bolt by means of a wrench so that the bolt head is rotated through three complete rotations, and then is further rotated until the slot or groove 28c carried on the bolt is brought into alignment with the arrow 24 carried by the nut 26. This status of alignment is depicted in FIG. 3. At this time, optimum tensioning will have been achieved.

It will be understood that the invention also comprehends placement of registering marks on the nut and an adjacent structural member, and then tightening the assembly by rotating the nut, while holding bolt stationary, until the required alignment is achieved.

In the aspect of the invention which encompasses a manfacturing technique for manufacturing bolts for use in the tensioning method of the invention, a visible mark is initially placed on the bolt at a location offset from the rotational axis of the bolt so that the mark will rotate about the axis of the bolt as it is tightened. A typical bolt of the same type being manufactured, and selected from the lot of manufactured bolts, is then, in a very clean state, and using a highly accurate torque wrench or length measuring device, used to join a plurality of clean structural members of the type upon which it will be used by the ultimate purchasers. Before commencing to tighten the bolt by means of any type of wrench, or force multiplying device, the nut of the bolt is tightened with the fingers until the nut is finger tight, and the structural members are in their joined status in the position they will occupy after the bolt has been tensioned to the degree desired. Also, before commencing to tighten the bolt by means of a wrench, a second visible mark referred to hereinafter as the indexing mark is placed on a non-moving member adjacent the bolt or its shank. This may be the nut of the bolt, or a washer, or one of the structural members to be joined by the use of the bolt. In any event, the indexing mark is placed on a member facilitating its observation and located as near as possible to the mark on the bolt.

Tensioning of the bolt is then commenced in the conventional manner, either by use of a conventional wrench, or a highly accurate torque wrench. Turning of the head of the bolt is continued until the bolt fails, with continuous torque readings being taken, or the lengthening of the bolt being continuously measured. The torque applied, or the length of the bolt at failure, is observed. Observations are also made frequently (about every one-quarter turn) of the relationship of the mark on the bolt to the indexing mark on the adjacent stationary or non-moving structure. The number of full turns of the bolt head are counted, so that at failure, the number of complete turns is known, as is the nearest one-quarter turn of the bolt head in reference to the index mark on the stationary structure immediately prior to failure.

The process is then repeated with a second bolt in the lot, except that in the case of the second bolt, the bolt is merely tensioned until, by visual observation, the structural members to be joined thereby are tightly interfitted, and the bolt is placed in substantial tension. The torque reading of the torque wrench or the lengthening of the bolt are measured at this time and noted. Also noted are the number of complete turns which have been undergone by the head of the bolt, and the angular or offset relationship, to the nearest quarter turn, of the mark carried by the bolt to the indexing mark on the adjacent stationary structure. Values of torque or bolt length are then selected which are halfway between the relatively low values noted when the structural members to be joined have been pulled together and secured in their desired joined relationship, and the higher value of the torque applied, or the bolt lengthening, which was noted at the time of the bolt failure. In other words, the high and low values are averaged.

Following this time, a random number of bolts such as perhaps three or four, are subjected to the same test, using the average value of applied torque or lengthening derived in the manner described. In each run or test, the number of turns made by the bolt head, plus the additional fractional turn made by the bolt head, and the relative position at the end of such fractional turn of the mark carried by the bolt with respect to the index mark on the adjacent stationary structure are noted. An average value is then taken of the number of turns of the bolt head and index mark in relation to the mark carried by the bolt. The value thus obtained will usually be in terms of the number of complete revolutions of the bolt head and a fractional revolution sufficient to bring the mark carried by the bolt to 90° past the index mark, or one-half turn past the index mark, or three-quarters of a turn past the index mark. In the case of hex head bolts, the fractional turns which are observed and constitute the frame of reference for fixing the relative position of the bolt mark vis-a-vis the index mark can be conveniently referred to in sixths of a turn in correspondence to the apexes or vertexes on the hex head of such bolts.

When the foregoing described technique has been used in the manufacture of the bolt, the manufacturer can then prescribe that in the use of the bolt, the bolt shall be placed in position to join the structural members which it is intended to join and which constitute the anticipated end use of the bolt. The instructions can then further provide that after finger tightening of the nut on the bolt, a mark shall be placed (by the use of an included marker pencil provided with the bolts as manufactured) on an adjacent structural member, such as the nut, or the specified uppermost one of the structural members to be joined, in a position immediately adjacent the head of the bolt and located one-quarter of a turn around the bolt from the index mark, etc. The instructions will then further provide that the bolt is to be rotated three full times and then again until the second mark or index mark on the structural member is brought into precise alignment or registry with the mark carried on the bolt. If these instructions are followed, proper tensioning of the bolt will result, and the bolt will not be overstressed and fail due to fatigue after a very short service life.

In an alternative manufacturing technique, the actual linear elongation of the bolt shank which is undergone in the bolt at the instant of failure upon tightening can be calculated mathematically, employing engineering knowledge as to the type of metal utilized in the bolt shank, the dimensions of the shank between the head of the bolt and the nut when the nut has been tightened firmly against the structural member against which it abuts in the final secured assembly, and the types of thread used on the bolt, or such linear elongation can simply be measured. In other words, linear elongation of the bolt shank which can be sustained over the interval between the nut and the head without failure of the bolt can be predetermined by measurement or mathematically. This elongation can then be mathematically converted to the actual number of rotations of the head or of the nut which is required in tightening the bolt to effect this amount of elongation. In this way, the number of turns of the bolt head or nut required to tension the bolt to the point of failure can be computed. An arbitrary fraction of a complete turn of the bolt head can then be subtracted from this point of failure figure to give a safe tensioning value to be used in the instructions for use of the bolt, and this value placed on the bolt head. If desired, the number of turns and fractional turn, as thus calculated, can be tested using a number of randomly selected bolts from the manufactured lot to which the instructions for tensioning are made applicable.

It will be understood that in the case of some nuts and bolts, proper torquing and tensioning of the bolt after the nut thereon has been screwed up to a finger tight status, or to contact with one of the members which the nut and bolt combination joins, will be effected with less than one complete revolution or turn of the bolt with respect to the nut. Therefore, it should be understood that reference made herein and in the claims to a "predetermined number of complete rotations" is intended to refer to cases where the number of complete rotations is actually zero.

Although preferred embodiments of certain aspects of the invention have been herein described in order to provide guidelines for its practice which may be followed by those skilled in the art, it will be understood that various changes and innovations in the described methods and techniques can be effected without departure from the basic principles of the invention. Changes and innovations of this type are therefore deemed to be circumscribed by the spirit and scope of the invention except as the same may be necessarily limited by the appended claims, or reasonable equivalents thereof.

What is claimed is:

1. The method of tensioning a nut-bolt combination comprising the steps of:

placing a first indexing mark in a visible location on a portion of the nut-bolt combination;

placing a second indexing mark at a predetermined location on a non-moving member which is juxtapositioned with respect to the portion of said nut-bolt combination carrying said first mark as the bolt of the combination is tensioned for joining two members together, said second indexing mark being positioned on said non-moving member at a location such that said first and second indexing marks are aligned when the bolt has been properly tensioned;

screw tightening the nut-bolt combination until the nut and the bolt head thereof are in positions of contact with the members to be joined by use of the nut-bolt combination; and then rotating the portion of said nut-bolt combination which carries said first indexing mark to tension the bolt, and continuing said rotation for a predetermined and specified number of complete rotations, and, in addition, effecting such further rotation of the head of the bolt as is needed to bring said first and second index marks into alignment.

2. The method of tensioning a nut-bolt combination as defined in claim 1 wherein said first indexing mark is placed on the head of the bolt in the nut-bolt combination.

3. The method of tensioning a bolt as defined in claim 2 wherein said second indexing mark is placed on one of the members to be joined by the bolt, and positioned immediately under the head of the bolt.

4. The method of tensioning a bolt as defined in claim 1 wherein the second indexing mark is placed on the nut.

5. The method of tensioning a nut as defined in claim 2 wherein said first indexing mark is one of the corners of the head of a bolt having a hexagonally shaped head.

6. The improvement in a process for manufacturing bolts comprising:
   a. placing a visible mark on one of the bolts from an identically fabricated lot of bolts at a location offset from the rotational axis of the bolt so that the mark will rotate about the axis of the bolt as it is tightened;
   b. screwing on said one bolt, a nut from a lot of nuts fabricated identically for use on said bolts, effecting said screwing as the nut and bolt are used to join two structural members of the type intended to be joined by the bolt, and continuing said screwing until the nut is finger tight and against one of said two structural members;
   c. placing an indexing mark on a non-moving member adjacent the bolt in a location to facilitate visual observation of registration and alignment of said first mentioned mark with said indexing mark;
   d. turning the head of the bolt to tighten the bolt until the bolt fails, observing in doing so the number of turns of the bolt head, and the fraction of a complete additional turn undergone at failure;
   e. repeating steps a, b and c with a second bolt and second nut selected at random from said lots;
   f. turning the head of the second bolt to tighten the second bolt until the second bolt is visually and by feel placed in substantial tension, observing in doing so, the number of turns of the bolt head, and the fraction of a complete turn undergone by the bolt head;
   g. averaging the number of turns and the fractional turn of the bolt head at failure of the first bolt with the number of turns and fractional turn of the bolt head of the second bolt in achieving substantial tension; and
   h. preparing written instructions for optimum tensioning of the bolts of the lot, using said average value to indicate the extent to which the bolt head is to be turned, and placing visible indicia on the bolt head of each bolt being manufactured to indicate at least the number of complete turns of the head to effect optimum tensioning.

7. The improvement defined in claim 6 wherein the first and second bolts are tightened with a torque wrench and the value of the torque applied at failure of the first bolt and the value of the torque applied upon completing the turning of the head of the second bolt, are measured and averaged; then tightening a number of additional bolts from the lot in the same manner, using the same torque wrench, and turning the head of each such additional bolt until said average value of torque is applied thereto;

observing the number of complete turns and the additional fraction of a complete turn undergone by each bolt in achieving such average torque value; and then averaging the number of complete turns and fraction of a complete turn undergone in tensioning the several additional bolts to said average tension; and preparing written instructions for optimum tensioning of the bolts, using said average value to indicate the extent to which the bolt head is to be turned, and placing visible indicia on the bolt head of each bolt being manufactured to indicate at least the number of complete turns of the bolt head needed to effect optimum tensioning.

8. The method of manufacturing bolts and nuts which comprises:
   a. determining the extent to which the shank of the bolt is elongated at the time of failure of the bolt due to tensioning the bolt for the purpose of joining two structural members together by the use of the bolt and of a nut intended to be used therewith;
   b. converting the determined shank elongation at failure of the bolt to a number of complete rotations and a fractional rotation of the bolt head or nut which, upon tightening the bolt in joining said structural members, will produce such elongation of the bolt shank; and
   c. placing visible indicia on the bolt or nut indicative of a number of rotations of the bolt or nut which should be employed for joining two such structural members together using such bolt and nut, said number of rotation being an arbitrary fraction of a complete turn less than the determined number of step b.

* * * * *